(12) United States Patent
Gardner (10) Patent No.: US 7,331,747 B2
(45) Date of Patent: Feb. 19, 2008

(54) LOAD TRANSFER SYSTEM FOR FLATBED TRUCKS

(75) Inventor: Noël Gardner, St-Helene de Chester (CA)

(73) Assignee: Les Aciers Solider (1985) Inc., Victoriaville, Quebec (CA)

( * ) Notice: Subject to any disclaimer, the term of this patent is extended or adjusted under 35 U.S.C. 154(b) by 149 days.

(21) Appl. No.: 11/265,296

(22) Filed: Nov. 3, 2005

(65) Prior Publication Data

US 2007/0098530 A1    May 3, 2007

(30) Foreign Application Priority Data

Nov. 2, 2005    (CA) .................................... 2525165

(51) Int. Cl.
*B65G 67/02*   (2006.01)

(52) U.S. Cl. ...................... 414/392; 414/399; 414/573

(58) Field of Classification Search ................ 414/344, 414/391, 392, 399, 573, 668, 809
See application file for complete search history.

(56) References Cited

U.S. PATENT DOCUMENTS

| | | | | |
|---|---|---|---|---|
| 1,932,955 | A | * | 10/1933 | Coppinger .................. 414/809 |
| 3,958,701 | A | * | 5/1976 | Yatagai et al. .............. 414/349 |
| 4,027,823 | A | * | 6/1977 | Kawarai et al. ............. 414/392 |
| 4,522,547 | A | * | 6/1985 | Douthit et al. .............. 414/391 |
| 4,728,241 | A | * | 3/1988 | Edelhoff et al. ............ 414/392 |
| 4,790,712 | A | * | 12/1988 | Batson ....................... 414/399 |
| 4,877,365 | A | * | 10/1989 | Lanigan Jr. et al. ........ 444/459 |
| 4,880,347 | A | * | 11/1989 | Lombard ..................... 414/542 |
| 6,224,314 | B1 | * | 5/2001 | Mann ......................... 414/392 |

FOREIGN PATENT DOCUMENTS

JP    04-72225 A   *   3/1992   ................. 414/391

* cited by examiner

*Primary Examiner*—James Keenan
(74) *Attorney, Agent, or Firm*—Ogilvy Renault LLP (57) ABSTRACT

A load transfer system for flatbed trucks is described. A load transfer bay is defined between opposed rigid longitudinal load support beams. Each of the beams is connected to individually controllable adjustable support members in the form of pistons to adjust the elevation of the beams above a ground surface of the load transfer bay. A load support platform is displaceable from a retracted position outside the bay to a support position across and over the opposed load support beams for support contact therewith. The support platform has a plurality of spaced-apart support arms secured at an attachment end to a displaceable interconnecting member and projects therefrom in a substantially common plane to a free end thereof.

13 Claims, 9 Drawing Sheets

LOAD TRANSFER SYSTEM FOR FLATBED TRUCKS

TECHNICAL FIELD

The present invention relates to a load transfer system for flatbed trucks, and particularly, but not exclusively, for loading and unloading a load of steel beams on the flatbed transporter of the truck.

BACKGROUND ART

It is common practice with fabrications of steel beams, rods and other component parts to store such products outside in yards. A purchaser places an order for a predetermined quantity of such components which are often of different sizes. It is common practice to ship these components on flatbed trucks and these are loaded directly in the yard. Usually the flatbed truck is that of a transport company or of the purchaser. When the flatbed truck arrives at the yard where the steel components are required to be loaded on the flatbed truck it is often necessary to displace the flatbed truck in the yard because the steel beams are usually classified by size and category and are located at different areas. Also, when loading the flatbed truck it is necessary to displace a loading equipment with the truck to load each individual component one a time and place them in proper position on the flatbed truck and in rows disposed on one another when there are many of such components such as steel beams. Wood beams are disposed transversely on the flatbed and in-between separate rows. This is a common practice in this industry and it is very time consuming task to load the flatbed transporter. Accordingly, the flatbed transporter and its conductor are idled in the yard for several hours and this adds to the cost of delivering the goods to the purchaser. Still further, because of the urgency in having to load the flatbed transporter there are often errors made in filling the purchase order. Further, because the conductor is idle, he often will wonder outside the truck and this may be hazardous due to the fact that the steel components being loaded by cranes or other beam equipment have to be manipulated and position the components on the flatbed, thus creating a hazard to any person in the vicinity of the flatbed transporter.

SUMMARY OF INVENTION

It is a feature of the present invention to overcome the above-mentioned disadvantages of the prior art by the provision of a load transfer system capable of positioning a load on a flatbed transporter quickly and efficiently.

Another feature of the present invention is to provide a method of transferring a load from or to a flatbed transporter of a truck in a quick and efficient manner.

According to the above features, from a broad aspect, the present invention provides a load transfer system for flatbed trucks and which comprises a load transfer bay defined between opposed rigid longitudinal load support beams. Each of the beams is connected to individually controllable adjustable support means to adjust the elevation thereof above a ground surface of the load transfer bay. A load support means is displaceable from a retracted position, outside the bay, to a support position, across and over the opposed load support beams for support contact therewith. The support means has a plurality of spaced-apart support arms secured at an attachment end to a displaceable interconnecting member and projecting therefrom in a substantially common plane to a free end thereof.

According to a still further broad aspect of the present invention there is provided a method of transferring a load from or to a flatbed transporter of a truck. The method comprises positioning the flatbed transporter in a load transfer bay between opposed rigid longitudinal load support beams. The elevation of at least one of the support beams is adjusted with respect to a support surface of the flatbed transporter by actuating controllable adjustable support means. A load support means, associated with the at lest one of the support beams, is positioned over the support surface. The controllable adjustable support means is reactuated to cause the load support beams and the load support means to either (a) lift a load from support elements on the support surface of the flatbed transporter, or (b) position a load on the support elements positioned on the support surface. The load support means is then retracted from the load transfer bay and the flatbed transporter is removed from the load transfer bay.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
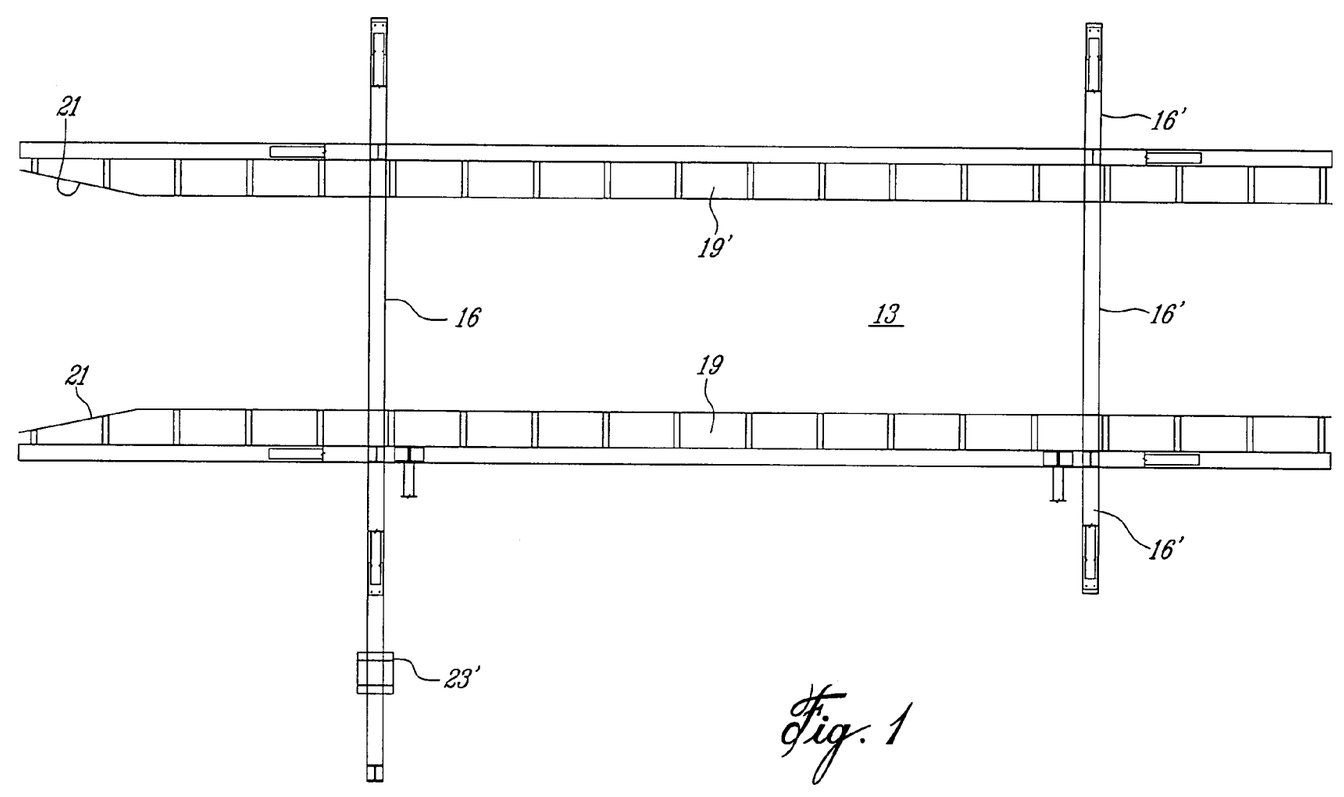
FIG. 1 is a top view showing the construction of the load transfer bay.
Figure 2:
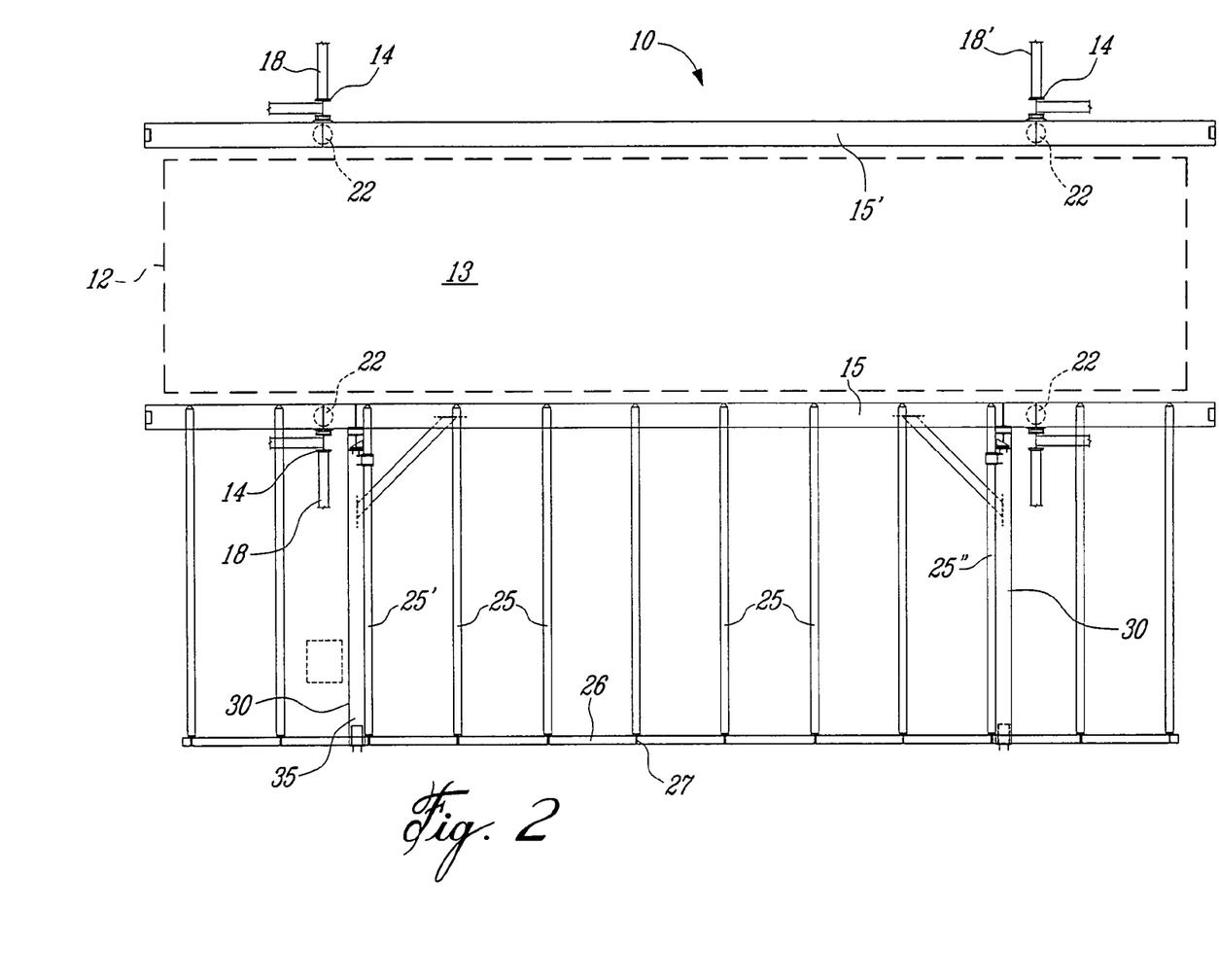
FIG. 2 is a top view similar to FIG. 1 but showing the plurality of spaced-apart support arms which form a support platform and disposed adjacent the load transfer bay.
Figure 3:
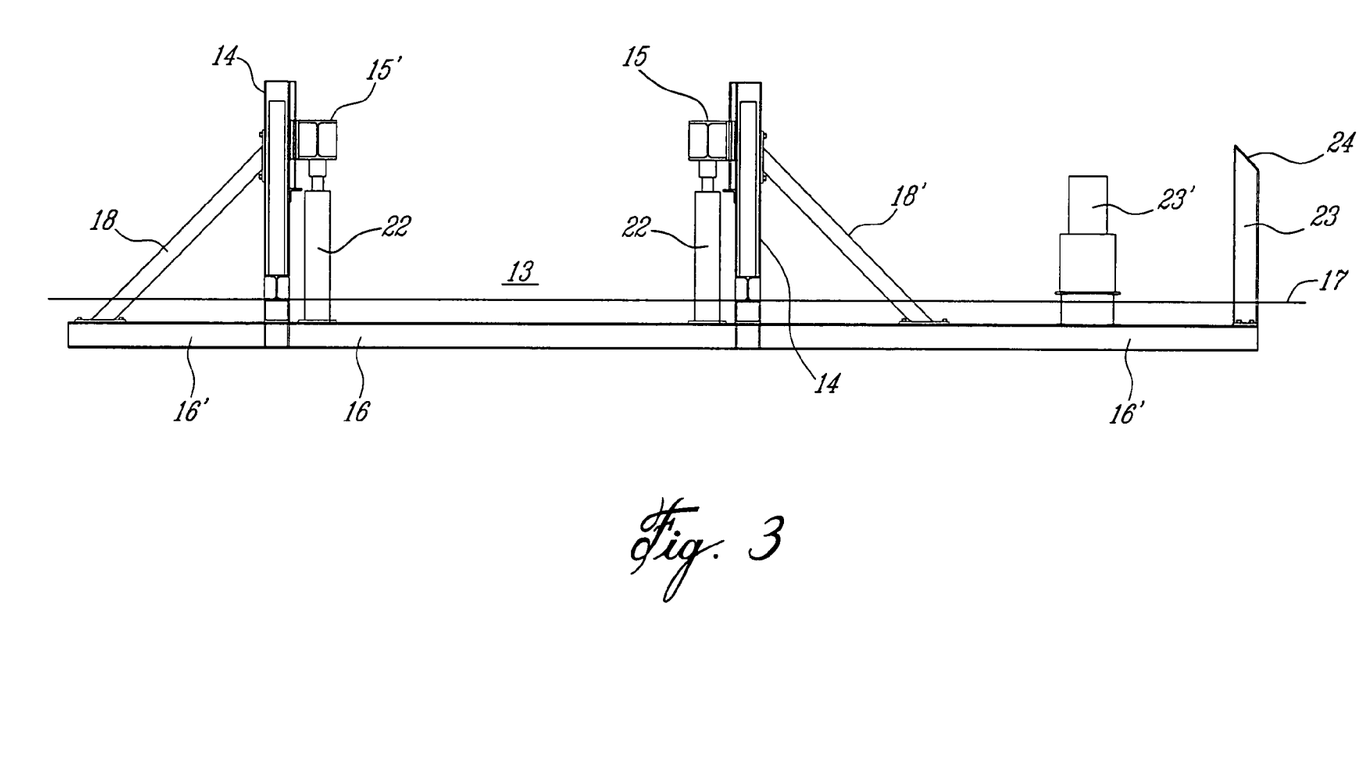
FIG. 3 is a schematic end view showing the construction of the load transfer bay with the load support beams.

Referring now to the drawings and more particularly to FIGS. 1 to 5, there is shown the load transfer system 10 of the present invention for positioning a prefabricated load 11 (see FIGS. 10A and 10B) onto a flatbed transporter 12 of a truck. Referring now to FIGS. 1, 2 and 3 there is shown the construction of the load transfer bay in which a flatbed transporter of a truck is positioned to either remove or place a prefabricated load thereon. The load transfer bay 13 is defined between four guide posts 14 to which are displaceably connected two opposed rigid longitudinal load support beams 15 and 15'. The vertical guide posts 14 are connected to transverse lower beams 16 and 16' which extend transversely across the bay 13 and which are buried in the ground surface 17 of the bay 13. Structural brackets 18 and 18' are disposed outside the load transfer bay 13 and connected between the vertical guide posts 14 and outer extension portions 16' of the transverse lower beam 16.

As shown in FIG. 1, opposed guide rails 19 and 19' are secured to each pair of vertical guide posts 14 on a respective side of a load transfer bay 13 for guiding the wheels 20 (see FIGS. 10A and 10B) of a flatbed truck positioned within the bay. These guide rails 19 and 19' have a taper 21 or angled wall section at an entrance end of the bay whereby to facilitate guiding a flatbed truck when backing into the bay.

Each of the load support beams 15 and 15' are connected to individually controllable adjustable support means in the form of two pistons 22 connected under a respective one of the opposed load support beams. These pistons 22 are connected under the beams adjacent the vertical guide posts 14, as illustrated more clearly in FIG. 2. Accordingly, there is a piston positioned adjacent opposed ends of these load support beams and the pistons are individually controlled by a control unit 23 which is provided with control arms 24 to actuate each of the pistons 22. The control unit also has other controls, as will be described later. As shown more clearly in FIGS. 2 and 3, these load support beams extend substantially parallel to one another.

Figure 4:
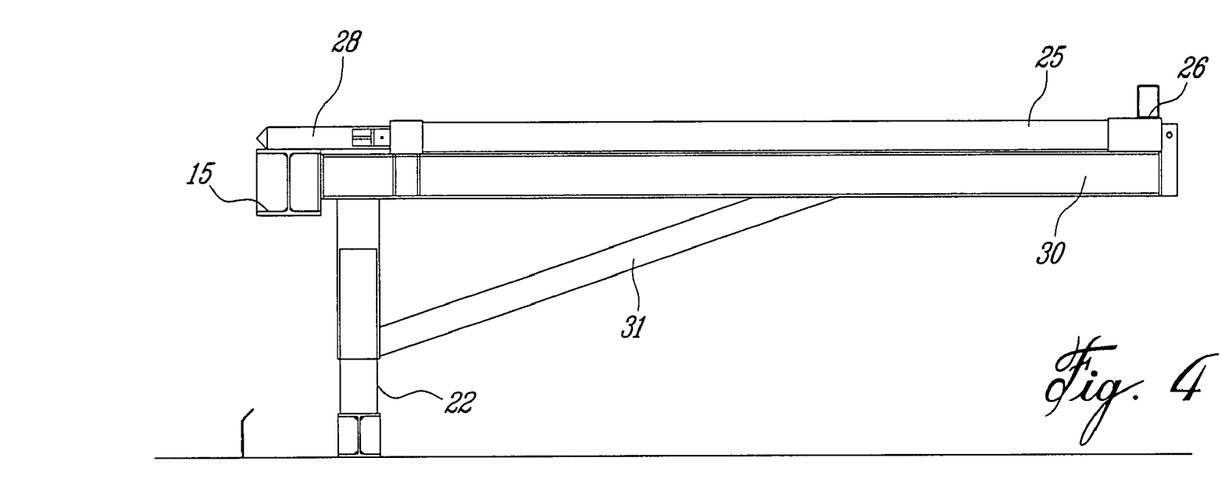
FIG. 4 is a schematic end view showing the construction of the support frame which supports the load support arms and its interconnecting beam and located at a retracted position.

With reference now more specifically to FIGS. 2 and 4, it can be seen that a load support means, in the form of a plurality of spaced-apart support arms 25, are interconnected by an interconnecting member 26 and is provided on one side of the bay 13. These support arms 25 are equidistantly spaced from one another and secured at an attachment end 27 to the interconnecting member 26 which is an elongated beam extending also parallel to the load support beams 15. The spaced-apart support arms 25 project from the interconnecting beam 26 in a substantially common plane and the free end 28 of these support arms, when in a retracted position as shown in FIG. 2, are resting on the top surface 29 of an associated load support beam 15.

As shown in FIG. 4, a support frame 30 is displaceably connected to the guide post 14 associated with the load support beam 15 and displaceable with the load support beam 15. The support frame 30 is disposed on an opposed side of the load transfer bay 13. A support bracket 31 is secured to the support frame 30 and displaceable therewith at its attachment end to the vertical guide post 14. One of the support frame 30 is associated with each of the support guide posts of the associated load support beam 15.

Figure 5:
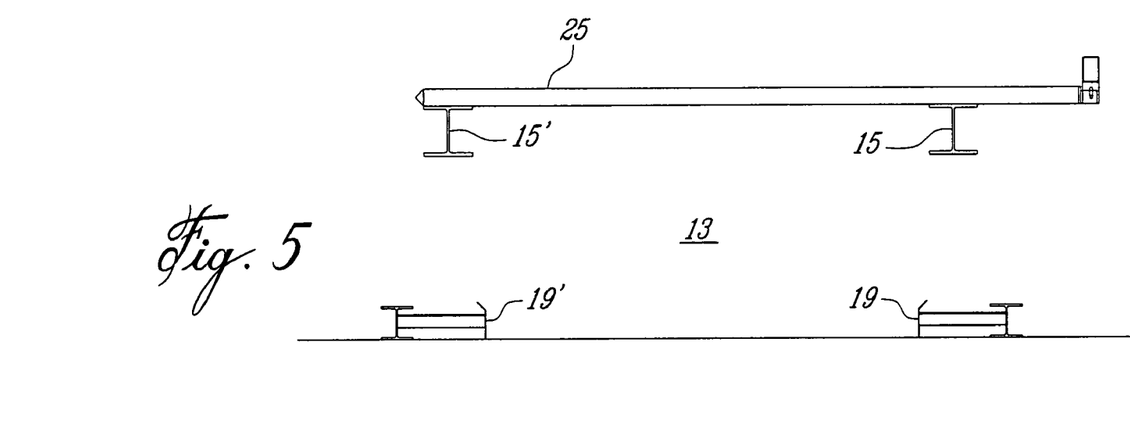
FIG. 5 is a schematic end view showing the support arms at a support position across the load support beam.

FIG. 4 shows the load support means or platform constituted by the spaced-apart support arms 25 at a retracted position whereas FIG. 5 shows the arms at a support position across and over the opposed load support beams and spans over the load transfer bay 13. In order to displace this load support platform there is provided actuating means constitute by actuating pistons 35, see FIGS. 2 and 9, which are connected over a respective one of the support frames 30 in a manner as better seen from FIG. 9. The pistons 35 have their piston rod end 36 secured to an associated one of the support arms, herein arms 25' and 25" whereby to draw the interconnecting member 26 and all of its support arms 25 to the load support position, as shown in FIG. 5, and then to retract it to its retracted position as shown in FIG. 4. These pistons 30 constitute an actuating means to displace the load support frame.

Figure 6A:
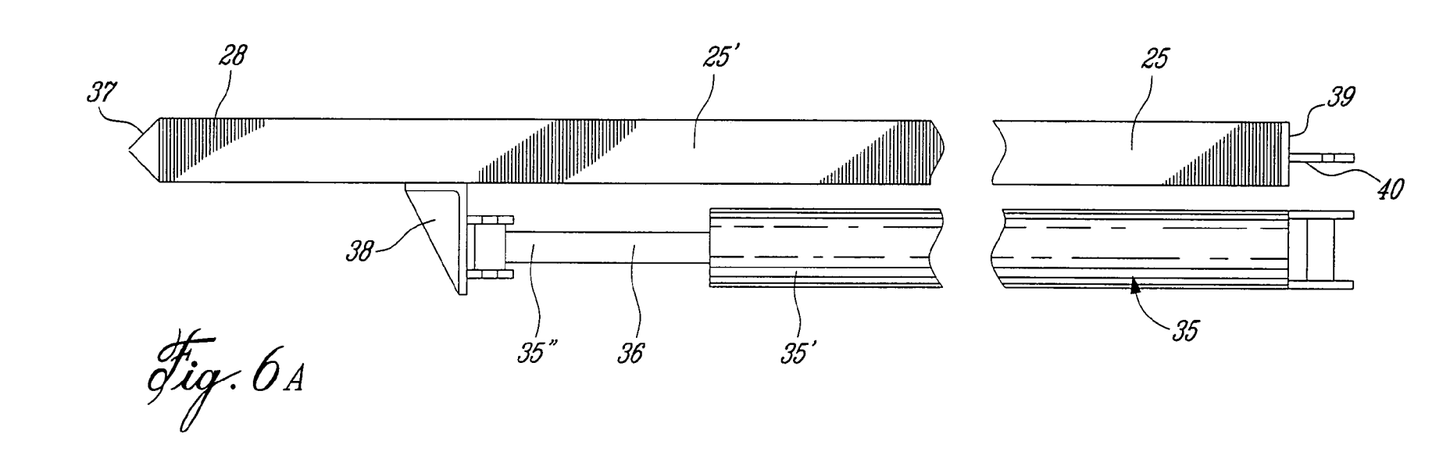
FIGS. 6A and 6B are side and top views of a support arm which is interconnectable to an actuating piston whereby to displace an interconnecting beam to which all support arms are secured.
Figure 6B:
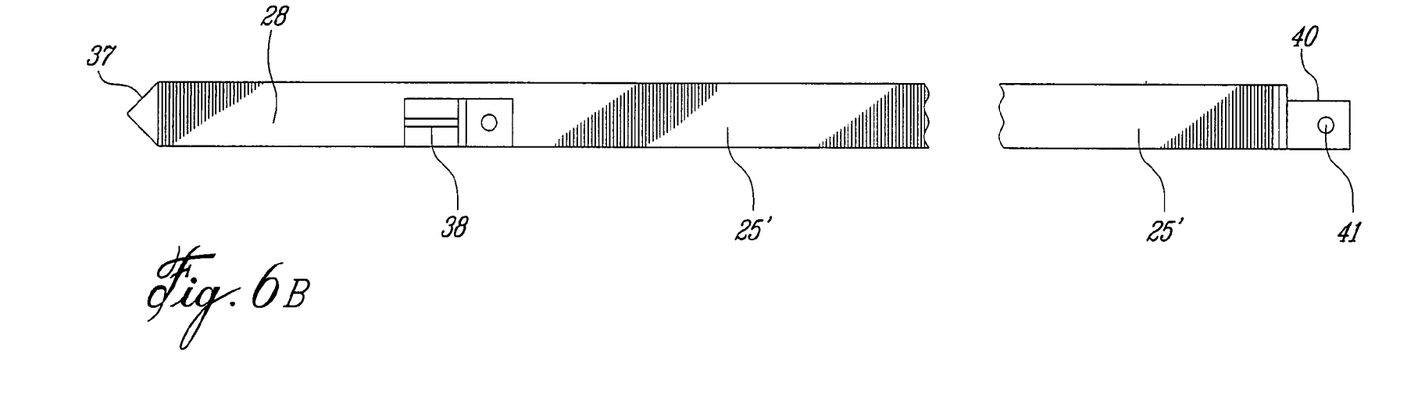

With reference to FIGS. 6A and 6B there is shown the construction of the support arms 25' or 25" and these arms are constructed from hollow steel rods of square cross-section whereby they have opposed flat surfaces. The free end 28 of the rods also has a taper 37 to facilitate its displacement over a flatbed surface and to cause deflection of the rods if they strike an object in its travel path. These two elongated rods 25' are provided with a connecting bracket 38 to secure to the piston rod end 36 as hereinshown. The other elongated rods 25 are of a like construction but do not have this connecting bracket 38. The connecting end 39 of these elongated rods 25 and 25' are provided with a connecting flange 40 which is provided with a through bore 41 for connection to the interconnecting member 26 in a manner as better illustrated in FIG. 9. As hereinshown, the interconnecting member 26 is provided with a depending bracket 42 and a bolt fastener 43 hingedly secures the connector 40 to the depending bracket 42. Accordingly, these elongated rods can pivot on their connection 40. Because of the length of these rods they are also capable of limited side deflection on opposed sides of their longitudinal axis. This facilitates its positioning under a load supported spaced above a flatbed surface, as will be described later.

Figure 9:
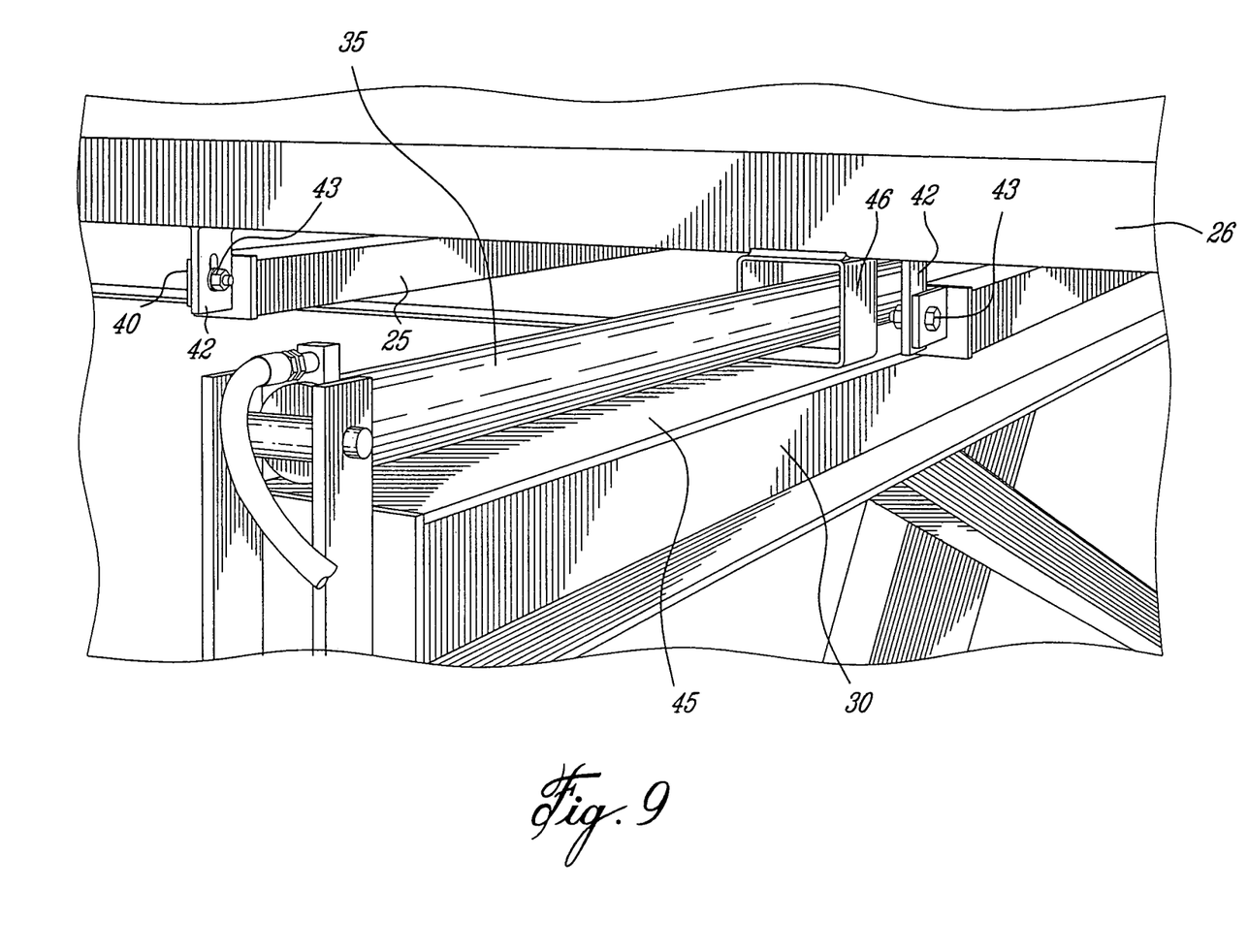
FIG. 9 is a perspective view showing the position of the piston cylinder of the actuating pistons as well as its relationship to the interconnecting beam and the support arms.

As shown in FIG. 9, the interconnecting member 26 is a straight metal beam. The support frame 30 is a transverse metal beam aligned with each of the vertical posts of the pair of guide posts associated with the load support beam 15 and extends at right angles to the load support beam. These transverse beams 30 have a flat top surface 45 and the interconnecting member 26 is supported on the flat top surface 45 by sliding support brackets 46 connected to the transverse beam 26.

As also shown in FIG. 9, the actuating pistons 35 have their piston cylinders 35' disposed spaced over a respective one of the flat top surfaces 45 of the transverse beams 30. The sliding support brackets 46 are displaceable about the cylinders 35'. As shown in FIG. 6A, the piston rod end 36 of the piston rod 35" of the cylinder 35' is coupled to a forward end of an associated one of the support arms, herein arm 25', to displace the interconnecting member 26 as above-described.

Figure 7:
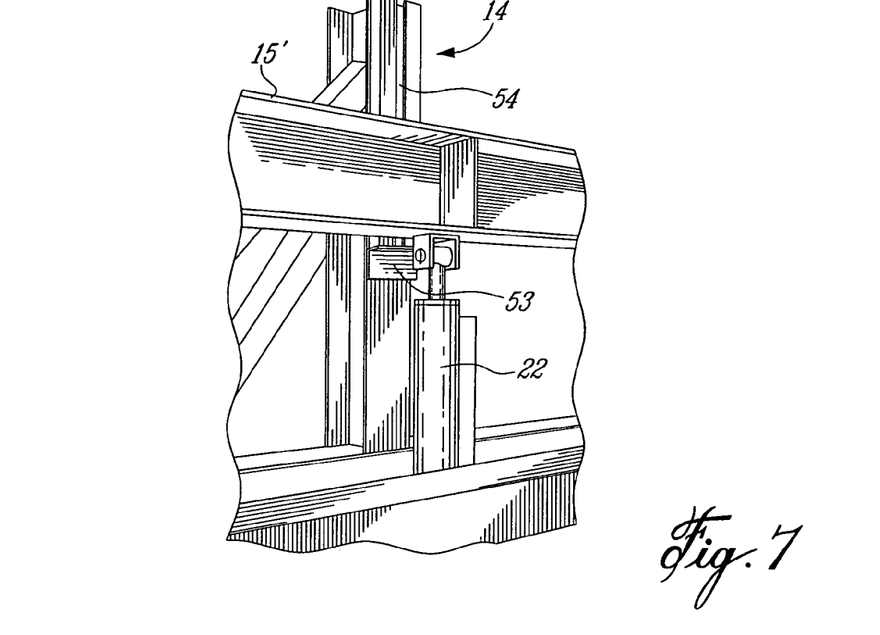
FIG. 7 is a perspective view showing the construction of the vertical guide post and its interconnection to the load support beam.
Figure 8:
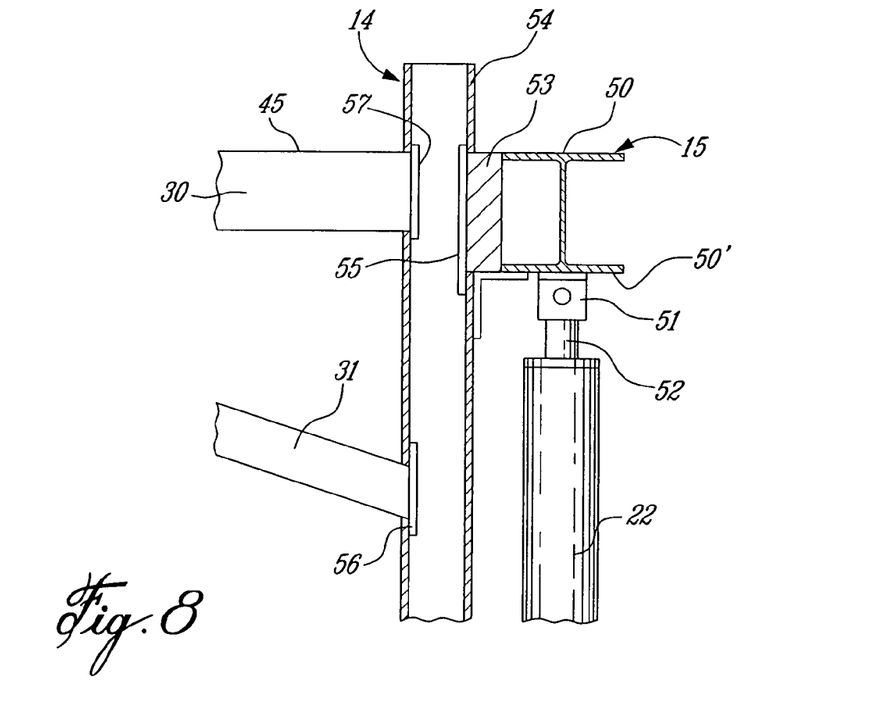
FIG. 8 is a partly cross-sectioned side view showing the interconnection of a load support beam to a vertical guide post and together with the displaceable interconnection of the support frame of the support arms.

Referring now to FIGS. 7 and 8, there is shown the manner in which the load support beams 15 and 15' are connected to the vertical guide posts 14. These load support beams 15 and 15' are steel H-beams and are provided with a flat top surface 50 on which the elongated rods 25 of square cross-sections will rest and be displaced. Piston connecting brackets 51 are secured to the bottom face 50' of the beams 15 and 15' to connect to the piston rod end 52 of the pistons 22. A connecting bracket 53 is secured to a side of the H-beam or load support beam 15 and projects into a slot 54 formed at a top end of the vertical guide post 14. A back plate 55 retains the H-beam in position for sliding displacement along the slot when actuated by the piston 52.

FIG. 8 is an illustration of the construction of the guide post on the side of the bay containing the displaceable load support platform and as can be seen this vertical guide post is slotted on opposed sides thereof and defines a longer slot 56 on the opposed side whereby to receive therein connecting brackets or flanges 57 of the support beam 30 as well as the support bracket 31 of the displaceable frame. This frame 30 is connected to the load support beam 15 on the other side of the vertical guide post and accordingly is displaced with the support beam and the top surface 45 of the support beam 30 is aligned with the top surface 50 of the load support beam, at all times. Accordingly, the elongated rods 25 will be resting on the flat top surface 50 of the load support beam 15 when in a retracted position and as illustrated in FIG. 4.

Figure 10A:
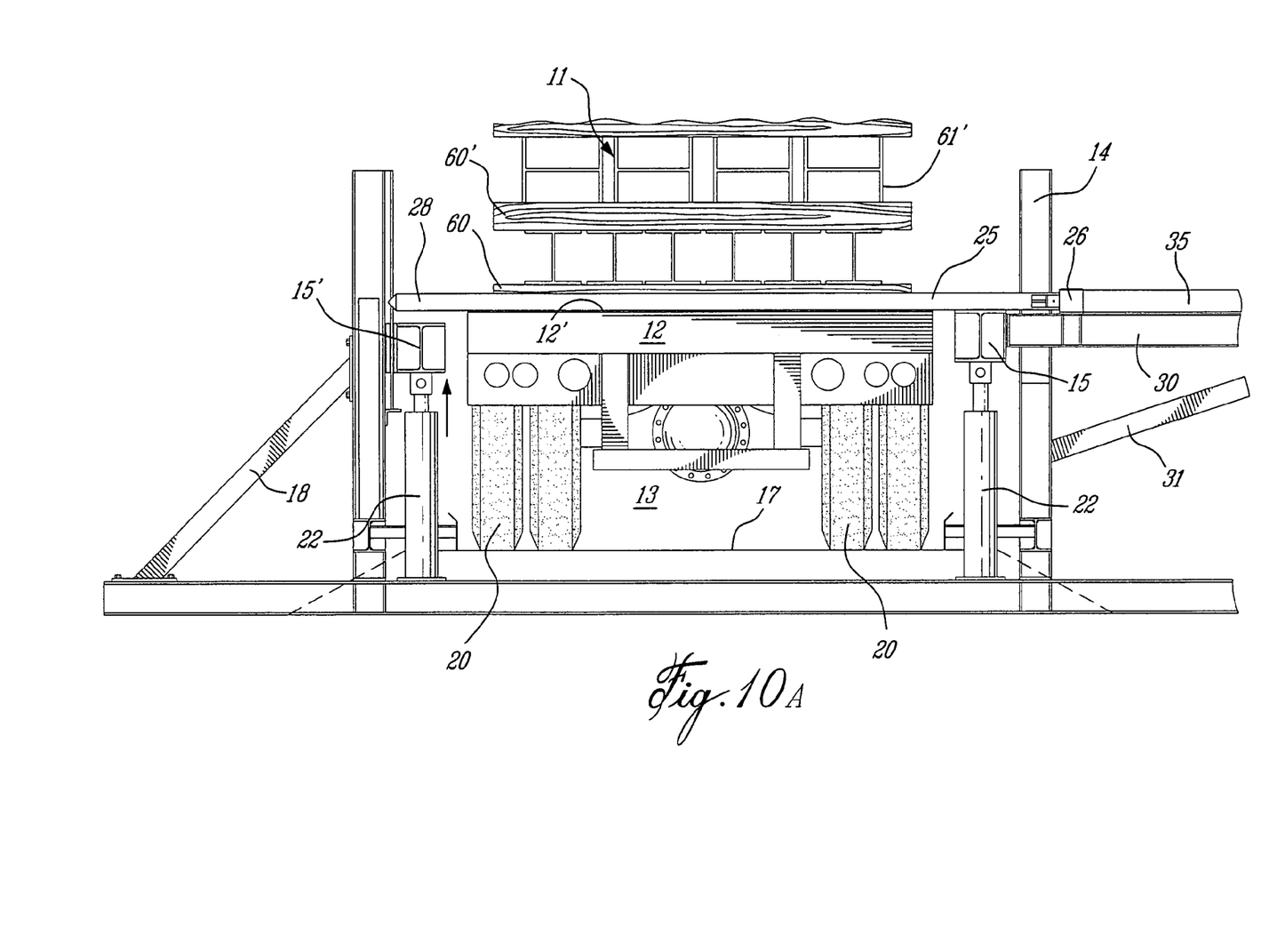
FIGS. 10A and 10B are schematic end views showing how a load is removed from a flatbed transporter of a truck to be transferred onto a further flatbed transporter.
Figure 10B:
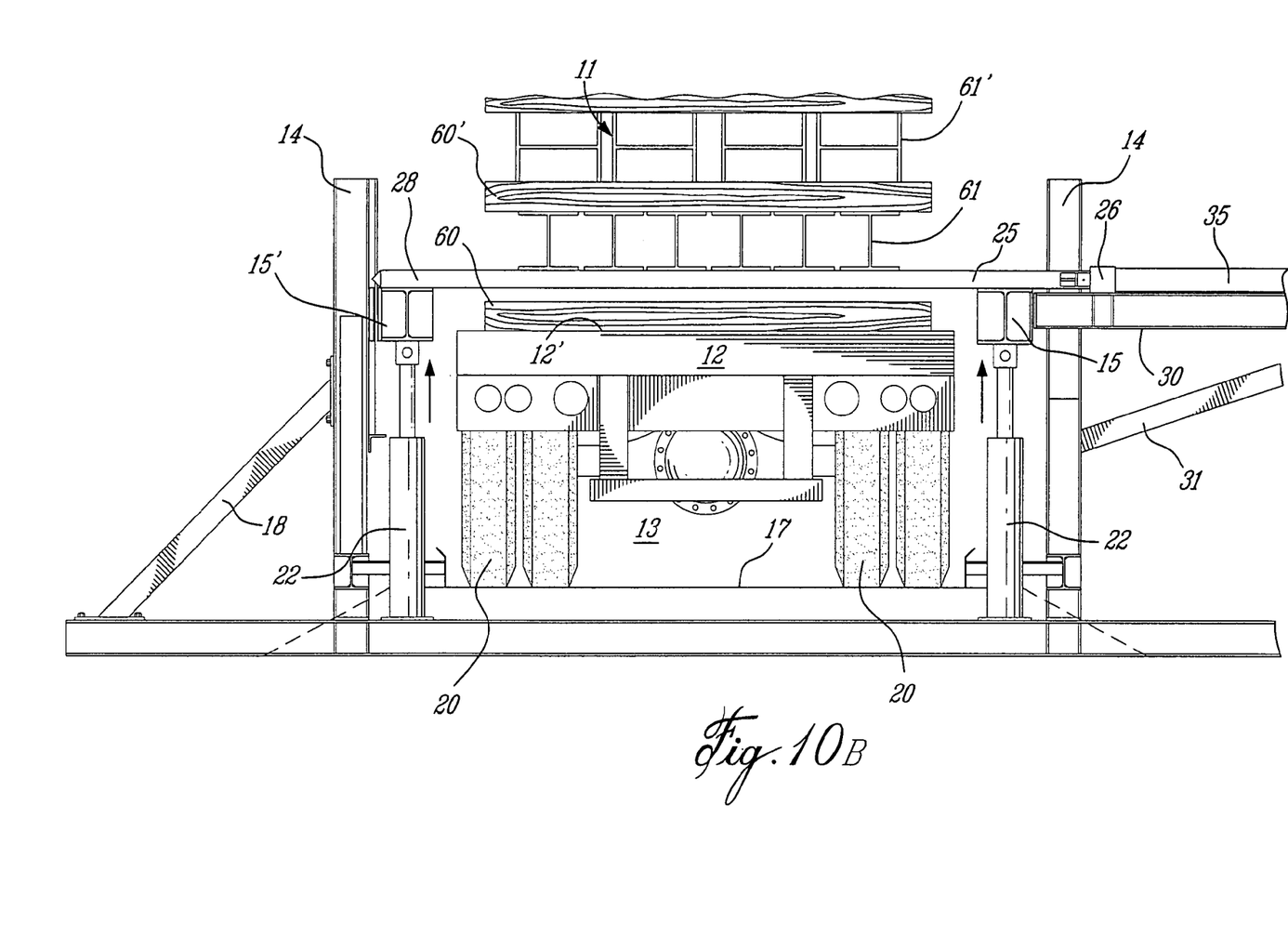

Referring now to FIGS. 10A and 10B, we will summarize the method of operation of the load transfer system of the present invention. First, a flatbed yard transporter, such as the transporter 12 illustrated in FIG. 10A, is loaded with a load to be placed on another flatbed transporter. To do this, transverse support elements in the form of elongated wood beams 60, having opposed flat surfaces, are disposed transversely along the top surface 12' of the flatbed transporter 12. A load 11, herein illustrated, is comprised of elongated steel H-beams 61 and these are disposed longitudinally along the flatbed over the support beams 60. After a bottom row has been completed, further support beams 60' are disposed thereover and another row of H-beams 61' are loaded thereon. Several of these layers may be constructed in a load.

The yard transporter with the load 11 is then backed into the bay 13 as illustrated in FIG. 10A and by the use of the control unit 23, the pistons 22 associated with the load support beam 15 are actuated to position the load support beam 15 substantially in planar alignment with the top surface 12' of the flatbed transporter 12. Thus, the elongated rods 25 of the load transfer platforms are aligned therewith. The transfer pistons of the load support platform are then actuated whereby to position the elongated rods 25 across the top surface 12' of the flatbed transporter and between the lower support beam 60. These elongated rods 25 are spaced apart sufficiently whereby to clear the support elements 60 and as previously described can flex should they encounter a side of a spacer wood beam. Also, because these flatbed transporters are not always perfectly horizontal, some being bowed, the load support beam 15 is adjustable from opposed ends thereof as each of the pistons 22 are individually controlled. This can permit the beam 15 to be slightly angulated to adapt to the slope of the top surface 12' of the flatbed transporter. After the elongated rods 25 have been extended fully across the load transfer bay 13, as shown in FIG. 10A, they are now projecting above the load support beam 15' on the other side of the load support bay. As shown in FIG. 10A, the pistons 22 of the load support beam 15' can then be actuated to position the load support beam 15' in close contact with the fee end portions 28 of the elongated rods 25. The load 11 is now ready to be elevated from the top surface 12' of the flatbed transporter. By actuating the controls 24 of the control unit 23, both of the load support beams 15 and 15' can be lifted at the same time and engage under the lower rows of H-beam 61 and lift them off the top surface 12' as illustrated in FIG. 10B. The flatbed yard transporter is now removed from the load transfer bay 13 and the load is ready to be positioned on a highway certified flatbed transporter for shipping the load to its purchaser. Accordingly, the highway transporter needs to only back into the bay, position wood supports 60 thereon and the load 11 is then lowered by lowering the load support beams 15 and 15', retracting the load transfer platform and the highway flatbed transporter is on its way for delivery after having tied down the load. All of this is done within a very short period of time and resulting in a cost saving as above-described due to the fact that the driver does not waste time to receive the load. This system also permits faster delivery time to its destination.

With this system there is utilized a flatbed yard transporter which operates only in the steel yard and it is an off-highway truck and its purpose is to permit loads to be pre-assembled and positioned in the load transfer bay or bays before a flatbed transporter arrives to receive the load to ship it to its destination. Because such a flatbed transporter only operates within a yard, there is no need to use a vehicle which is certified for highway travel and there is also no need to obtain registration thereof as it is used as a loading machine. An old, used, flatbed truck is all that is required.

It is within the ambit of the present invention to cover any obvious modifications of the preferred embodiment described herein, provided such modifications fall within the scope of the appended claims.

The invention claimed is:

1. A load transfer system for flatbed trucks comprising a load transfer bay defined between opposed rigid longitudinal load support beams, each said beam being connected to individually controllable adjustable support means to adjust the elevation thereof above a ground surface of said load transfer bay, a load support means displaceable from a retracted position outside said bay to a load support position across and over said opposed load support beams for support contact therewith, said load support means having a plurality of spaced-apart support arms secured at an attachment end to a displaceable interconnecting member and projecting therefrom in a substantially common plane to a free end thereof, said displaceable interconnecting member being secured to actuation means for the displacement thereof from said retracted position to said support position, said beams being displaceably connected to a pair of vertical guide posts, a support frame displaceably connected to one of said pair of guide posts on an opposed side of said load transfer bay, said support frame being connected to one of said load support beams and displaceable therewith, said displaceable interconnecting member being supported by said support frame and displaceable thereon.

2. A load transfer system as claimed in claim 1 wherein said free ends of said support arms are capable of deflection and pivoting with respect to said attachment end.

3. A load transfer system as claimed in claim 1 wherein said adjustable support means is comprised of two pistons connected under a respective one of said opposed load support beams.

4. A load transfer system as claimed in claim 3 wherein said two pistons are connected spaced from a respective one of opposed ends of its associated beam, each of said two pistons being individually controlled by control means to position its associated beam in a level plane or an angled plane.

5. A load transfer system as claimed in claim 4 wherein said opposed load support beams extend substantially parallel to one another, said beams being displaceably connected to a pair of guide posts.

6. A load transfer system as claimed in claim 1 wherein said actuation means is constituted by one or more actuating pistons connected to one or more of said support arms for displacing said interconnecting member and all of said support arms from said retracted position to said support position and back to said retracted position.

7. A load transfer system as claimed in claim 6 wherein said support arms are elongated rods having flat outer walls, said support arms being pivotally connected at said attachment end to said interconnecting member, said elongated rods being supported at said free end thereof on an upper surface of said one of said load support beams.

8. A load transfer system as claimed in claim 7 wherein said load support beams are steel H-beams.

9. A load transfer system as claimed in claim 7 wherein said elongated rods are hollow steel rods of square cross-section, said free end being a tapered free end.

10. A load transfer system as claimed in claim 6 wherein said interconnecting member is a straight metal beam, said support frame having a transverse beam aligned with each said vertical guide post of said one of said pair of guide posts, and extending at right angles to said load support beam which is displaceably connected to said guide posts, said transvers beams having a flat top surface, said interconnecting member being supported on said flat top surface of said transverse beam of each said pair of guide posts by sliding support brackets connected to said interconnecting member.

11. A load transfer system as claimed in claim 10 wherein each said actuating pistons has its piston cylinder disposed spaced over said flat top surface of a respective one of said transverse beams, said sliding support brackets being displaced about said cylinders, a piston rod end of a piston rod of said cylinders being coupled to a forward end portion of an associated one of said support arms to displace said interconnecting member and said support arms to said load support position when said piston rod is extended and to said retracted position when said piston is retracted.

12. A load transfer system as claimed in claim 1 wherein said vertical guide posts are connected to transverse lower beams adapted to be buried in said ground surface and spanning said load transfer bay, and structural brackets outside said load transfer bay connected between said vertical guide posts and outer extension portions of said transverse lower beams.

13. A load transfer system as claimed in claim 12 wherein there is further provided opposed guide rails secured to each said pair of vertical guide posts on a respective side of said load transfer bay for guiding the wheels of a flatbed transporter of a truck positioned therebetween.

* * * * *